US012026760B2

(12) United States Patent
Shi et al.

(10) Patent No.: US 12,026,760 B2
(45) Date of Patent: Jul. 2, 2024

(54) METHOD AND APPARATUS FOR TRANSACTING RESOURCE FLOW

(71) Applicant: Hefei Dappworks Technology Co., Ltd., Anhui (CN)

(72) Inventors: Yi Shi, Anhui (CN); Yang Zhang, Anhui (CN)

(73) Assignee: Hefei Dappworks Technology Co., Ltd., Anhui (CN)

( * ) Notice: Subject to any disclaimer, the term of this patent is extended or adjusted under 35 U.S.C. 154(b) by 496 days.

(21) Appl. No.: 17/283,824

(22) PCT Filed: Oct. 11, 2018

(86) PCT No.: PCT/CN2018/109828
§ 371 (c)(1),
(2) Date: Apr. 8, 2021

(87) PCT Pub. No.: WO2020/073277
PCT Pub. Date: Apr. 16, 2020

(65) Prior Publication Data
US 2021/0342899 A1   Nov. 4, 2021

(51) Int. Cl.
*H04L 12/00* (2006.01)
*G06Q 20/08* (2012.01)
(Continued)

(52) U.S. Cl.
CPC ....... *G06Q 30/0283* (2013.01); *G06Q 20/085* (2013.01); *H04L 9/3247* (2013.01); *H04L 12/14* (2013.01)

(58) Field of Classification Search
CPC .. G06Q 30/0283; G06Q 20/085; G06Q 10/06; G06Q 30/06; G06Q 40/00;
(Continued)

(56) References Cited

U.S. PATENT DOCUMENTS

| 2017/0085555 A1 | 3/2017 | Bisikalo et al. |
| 2017/0244720 A1 | 8/2017 | Kurian et al. |

(Continued)

FOREIGN PATENT DOCUMENTS

| CN | 107993066 A | 5/2018 |
| CN | 108009441 A | 5/2018 |

(Continued)

OTHER PUBLICATIONS

Chinese Patent Abstract (in English) of China Patent App. Pub. No. CN 107993066 A, Pub. dated May 4, 2018, downloaded Mar. 18, 2021, from https://worldwide.espacenet.com.

(Continued)

*Primary Examiner* — Frantz Coby
(74) *Attorney, Agent, or Firm* — Barcelo, Harrison & Walker, LLP

(57) ABSTRACT

A method for transacting a resource flow is provided. The method is applied to a blockchain server, and includes: acquiring initial transaction information for associating a requester client with a provider client, and sending the initial transaction information to other blockchain servers, to store the initial transaction information in respective corresponding blockchain database; acquiring certificate information indicative of a status of a resource flow usage of the requester client; and determining a first value indicative of a value added by the requester client to an account of the provider client based on the initial transaction information and the certificate information, and sending the first value to the other blockchain servers. An apparatus for transacting a resource flow, a computer equipment, and a computer-readable medium are further provided.

17 Claims, 5 Drawing Sheets

(51) Int. Cl.
*G06Q 30/0283* (2023.01)
*H04L 9/32* (2006.01)
*H04L 12/14* (2006.01)

(58) Field of Classification Search
CPC ..... G06Q 50/06; H04L 12/14; H04L 63/0823; H04L 2463/102; H04L 9/3263; H04L 9/50; H04L 9/3239
USPC .................................................. 709/223–225
See application file for complete search history.

(56) References Cited

U.S. PATENT DOCUMENTS

| | | | |
|---|---|---|---|
| 2019/0164157 A1* | 5/2019 | Balaraman | G06Q 20/3823 |
| 2019/0372756 A1* | 12/2019 | Kim | H04L 9/3263 |
| 2019/0379543 A1* | 12/2019 | Sethi | H04L 9/3236 |
| 2020/0092360 A1* | 3/2020 | Viswanathan | H04L 67/1093 |
| 2021/0083852 A1* | 3/2021 | Destefanis | G06F 21/64 |

FOREIGN PATENT DOCUMENTS

| | | |
|---|---|---|
| CN | 108197944 A | 6/2018 |
| WO | 2018020376 A1 | 2/2018 |
| WO | 2018020377 A1 | 2/2018 |

OTHER PUBLICATIONS

Chinese Patent Abstract (in English) of China Patent App. Pub. No. CN 108009441 A, Pub. dated May 8, 2018, downloaded Mar. 18, 2021, from https://worldwide.espacenet.com.
Chinese Patent Abstract (in English) of China Patent App. Pub. No. CN 108197944 A, Pub. dated Jun. 22, 2018, downloaded Mar. 18, 2021, from https://worldwide.espacenet.com.
European Patent Office Search Report, mailed on Mar. 23, 2022, of the International Application No. PCT/CN2018/109828, Applicant: Hefei Dappworks Technology Co., Ltd.
International Search Report, mailed on Jul. 8, 2019, of the International Application No. PCT/CN2018/109828, and English Translation.
Written opinion, in Chinese of the International Search Report, mailed on Jul. 8, 2019, of the International Application No. PCT/CN2018/109828.
English translation of the written opinion in Chinese of the International Search Report, mailed on Jul. 8, 2019, of the International Application No. PCT/CN2018/109828.
Abstract (in English) of Publication No. US 2017/0085555 A1, Pub. Date Mar. 23, 2017, downloaded Mar. 12, 2024, from https://worldwide.espacenet.com.
Abstract (in English) of Publication No. WO 2018/020376 (A1), Pub. Date Feb. 1, 2018, downloaded Mar. 12, 2024, from https://worldwide.espacenet.com.
Abstract (in English) of Publication No. WO 2018/020377 (A1), Pub. Date Feb. 1, 2018, downloaded Mar. 12, 2024, from https://worldwide.espacenet.com.

* cited by examiner

100

METHOD AND APPARATUS FOR TRANSACTING RESOURCE FLOW

CROSS-REFERENCE TO RELATED APPLICATIONS

This application is a Section 371 National Stage Application of International Application No. PCT/CN2018/109828, filed on 11 Oct. 2018, entitled "METHOD AND APPARATUS FOR TRANSACTING RESOURCE FLOW." That application is incorporated herein by reference in its entirety for all purposes.

BACKGROUND

Technical Field

The present disclosure relates to the field of Internet technology, and in particular to a method and an apparatus for transacting a resource flow.

Background

With the development of science and technology, social connectivity is increasing, and resource transaction and sharing have become more and more popular. Due to liquidity and consumption characteristics of a resource flow, a resource flow transaction is often conducted between a requester who needs to use the resource flow and a provider who can provide the resource flow. Usually in the prior art, only the requester and the provider are involved in the resource flow transaction. Due to a lack of reliable supervision from other parties, malicious behaviors such as one or more parties of the requester and the provider obtain illegal benefits through cheating often occur during the transaction, therefore, the resource flow transaction cannot be conducted in a fair, just and transparent manner.

SUMMARY

The In view of this, the present disclosure provides a method and an apparatus for transacting a resource flow, which may at least partially solve above problems.

One aspect of the present disclosure provides a method for transacting a resource flow applied to a blockchain server, including: acquiring initial transaction information for associating a requester client with a provider client, and sending the initial transaction information to other blockchain servers, to cause each blockchain server to store the initial transaction information in respective corresponding blockchain database; acquiring certificate information indicative of a status of a resource flow usage of the requester client; and determining a first value indicative of a value added by the requester client to an account of the provider client based on the initial transaction information and the certificate information, and sending the first value to the other blockchain servers, to cause each blockchain server to store the first value in the respective corresponding blockchain database.

Optionally, the acquiring initial transaction information for associating a requester client with a provider client includes: receiving transaction request information sent by the requester client, wherein the transaction request information includes identification information of the requester client, identification information of the provider client, and a digital signature of the requester client; verifying the transaction request information based on the digital signature of the requester client, and sending the transaction request information to the provider client in response to verifying of the transaction request information being true; receiving transaction permission information sent by the provider client, wherein the transaction permission information includes the transaction request information and a digital signature of the provider client; and verifying the transaction permission information based on the digital signature of the provider client, and using the transaction permission information as the initial transaction information for associating the requester client with the provider client, in response to verifying of the transaction permission information being true.

Optionally, the transaction request information further includes price information of the resource flow; and determining a first value based on the initial transaction information and the certificate information includes: determining a total amount of the resource flow used by the requester client based on the certificate information; and determining the first value based on the price information of the resource flow and the total amount of the resource flow used by the requester client.

Optionally, the transaction request information further includes a second value indicative of a value decreased from an account of the requester client; and determining a first value based on the initial transaction information and the certificate information further includes: determining a third value indicative of a value added to the account of the requester client if the second value is greater than the first value, wherein the third value is equal to difference between the second value and the first value; determining a fourth value indicative of a value decreased from the account of the requester client if the second value is less than the first value, wherein the fourth value is equal to difference between the first value and the second value; and sending the third value or the fourth value determined to the other blockchain servers, to cause each blockchain server to store the third value or the fourth value in the respective corresponding blockchain database.

Optionally, the transaction request information further includes a second value indicative of a value decreased from an account of the requester client; and determining a first value based on the initial transaction information and the certificate information further includes: recording difference between the second value and the first value as a fifth value if the second value is greater than the first value, adding the fifth value to the second value corresponding to a next transaction of the resource flow in a case where the next transaction of the resource flow is conducted by the requester client, and obtaining an updated second value corresponding to the next transaction of the resource flow.

Optionally, the acquiring certificate information indicative of a status of a resource flow usage of the requester client includes: receiving a resource flow usage certificate sent by the provider client, wherein the resource flow usage certificate includes a digital signature of the requester client and a digital signature of the provider client, and the resource flow usage certificate is sent from the requester client to the provider client; and verifying the resource flow usage certificate based on the digital signature of the requester client and the digital signature of the provider client, and using the resource flow usage certificate as the certificate information of the resource flow usage of the requester client, in response to verifying of the resource flow usage certificate being true.

Optionally, the resource flow includes at least one of a network traffic resource, a power resource, a computing power resource, and/or a designated data flow resource with a real-time dynamic status.

Another aspect of the present disclosure provides a method for transacting a resource flow applied to a requester client, including: selecting a provider client, and establishing an association with the provider client through a blockchain server; receiving and using a resource flow provided by the provider client; and generating certificate information indicative of a status of a resource flow usage according to a preset rule, and sending the certificate information to the blockchain server, to cause the blockchain server to determine a first value indicative of a value added by the requester client to an account of the provider client based on the certificate information.

Optionally, the selecting a provider client, and establishing an association with the provider client through a blockchain server includes: acquiring resource flow release information of a plurality of provider clients, wherein the resource flow release information includes identification information of provider clients and price information of the resource flow; and selecting a provider client based on the resource flow release information, and sending transaction request information to the blockchain server, wherein the transaction request information is forwarded by the blockchain server to the provider client selected, to cause the provider client to begin to provide the resource flow in a case where the transaction request information is permitted.

Optionally, the transaction request information includes a digital signature of the requester client, and the blockchain server forwards the transaction request information to the provider client in a case where the transaction request information is verified to be true based on the digital signature of the requester client.

Optionally, the generating certificate information indicative of a status of a resource flow usage according to a preset rule, and sending the certificate information to the blockchain server includes: during using of the resource flow, generating a resource flow usage certificate indicative of a current usage status every preset time interval, and sending the resource flow usage certificate to the provider client, to cause the provider client to send the resource flow usage certificate to the blockchain server.

Optionally, the resource flow usage certificate includes a digital signature of the requester client, and the provider client sends the resource flow usage certificate to the blockchain server in a case where the resource flow usage certificate is verified to be true based on the digital signature of the requester client.

Optionally, the resource flow includes at least one of a network traffic resource, a power resource, a computing power resource, and/or a designated data flow resource with a real-time dynamic status.

Another aspect of the present disclosure provides a method for transacting a resource flow applied to a provider client, including: establishing an association with a requester client through a blockchain server, and providing a resource flow to the requester client, to cause the requester client to receive and use the resource flow; acquiring certificate information indicative of a status of a resource flow usage of the requester client, and sending the certificate information to the blockchain server, to cause the blockchain server to determine a first value indicative of a value added to the provider client by the requester client based on the certificate information.

Optionally, the establishing an association with a requester client through a blockchain server, and providing a resource flow to the requester client includes: receiving transaction request information sent by the blockchain server, wherein the transaction request information includes identification information of the requester client and a digital signature of the requester client, and the transaction request information is sent from the requester client to the blockchain server; and sending transaction permission information to the blockchain server in a case where the transaction request information is permitted, and beginning to provide the resource flow to the requester client, wherein the transaction permission information includes the transaction request information and a digital signature of the provider client.

Optionally, the transaction request information further includes an estimated total amount of the resource flow to be used; and the establishing an association with a requester client through a blockchain server further includes: permitting the transaction request information in a case where the estimated total amount of the resource flow to be used is not greater than a total amount of the resource flow to be provided.

Optionally, the acquiring certificate information indicative of a status of a resource flow usage of the requester client, and sending the certificate information to the blockchain server includes: receiving a resource flow usage certificate sent by the requester client; and determining an end of using of the resource flow by the requester client in a case where the resource flow usage certificate is not received after exceeding a predetermined period of time, and sending the resource flow usage certificate received to the blockchain server.

Optionally, the resource flow usage certificate sent by the requester client includes a digital signature of the requester client, and the sending the resource flow usage certificate received to the blockchain server further includes: verifying the resource flow usage certificate based on the digital signature of the requester client, and sending the resource flow usage certificate to the blockchain server in response to verifying of the resource flow usage certificate being true; and/or the sending the resource flow usage certificate received to the blockchain server further includes: sending the resource flow usage certificate and the digital signature of the provider client to the blockchain server.

Optionally, the resource flow includes at least one of a network traffic resource, a power resource, a computing power resource, and/or a designated data flow resource with a real-time dynamic status.

Another aspect of the present disclosure provides an apparatus for transacting a resource flow applied to a blockchain server, including: an initiation module configured to acquire initial transaction information for associating a requester client with a provider client, and send the initial transaction information to other blockchain servers, to cause each blockchain server to store the initial transaction information in respective corresponding blockchain database; an acquisition module configured to acquire certificate information indicative of a status of a resource flow usage of the requester client; and a management module configured to determine a first value indicative of a value added by the requester client to an account of the provider client based on the initial transaction information and the certificate information, and send the first value to the other blockchain servers, to cause each blockchain server to store the first value in the respective corresponding blockchain database.

Optionally, the initiation module being configured to acquire initial transaction information for associating a requester client with a provider client includes: the initiation module being configured to: receive transaction request information sent by the requester client, wherein the transaction request information includes identification information of the requester client, identification information of the provider client, and a digital signature of the requester client; verify the transaction request information based on the digital signature of the requester client, and send the transaction request information to the provider client in response to verifying of the transaction request information being true; receive transaction permission information sent by the provider client, wherein the transaction permission information includes the transaction request information and a digital signature of the provider client; and verify the transaction permission information based on the digital signature of the provider client, and use the transaction permission information as the initial transaction information for associating the requester client with the provider client, in response to verifying of the transaction permission information being true.

Optionally, the transaction request information further includes price information of the resource flow; and the management module being configured to determine a first value based on the initial transaction information and the certificate information includes: the management module being configured to determine a total amount of the resource flow used by the requester client based on the certificate information, and determine the first value based on the price information of the resource flow and the total amount of the resource flow used by the requester client.

Optionally, the transaction request information further includes a second value indicative of a value decreased from an account of the requester client; and the management module is further configured to: determine a third value indicative of a value added to the account of the requester client if the second value is greater than the first value, wherein the third value is equal to difference between the second value and the first value; determine a fourth value indicative of a value decreased from the account of the requester client if the second value is less than the first value, wherein the fourth value is equal to difference between the first value and the second value; and send the third value or the fourth value determined to the other blockchain servers, to cause each blockchain server to store the third value or the fourth value in the respective corresponding blockchain database.

Optionally, the transaction request information further includes a second value indicative of a value decreased from an account of the requester client; and the management module is further configured to record difference between the second value and the first value as a fifth value if the second value is greater than the first value, add the fifth value to the second value corresponding to a next transaction of the resource flow in a case where the next transaction of the resource flow is conducted by the requester client, and obtain an updated second value corresponding to the next transaction of the resource flow.

Optionally, the acquisition module being configured to acquire certificate information indicative of a status of a resource flow usage of the requester client includes: the acquisition module being configured to: receive a resource flow usage certificate sent by the provider client, wherein the resource flow usage certificate includes a digital signature of the requester client and a digital signature of the provider client, and the resource flow usage certificate is sent from the requester client to the provider client; and verify the resource flow usage certificate based on the digital signature of the requester client and the digital signature of the provider client, and use the resource flow usage certificate as the certificate information of the resource flow usage of the requester client, in response to verifying of the resource flow usage certificate being true.

Optionally, the resource flow includes at least one of a network traffic resource, a power resource, a computing power resource, and/or a designated data flow resource with a real-time dynamic status.

Another aspect of the present disclosure provides an apparatus for transacting a resource flow applied to a requester client, including: a transaction establishment module configured to select a provider client, and establish an association with the provider client through a blockchain server; a resource receiving module configured to receive and use a resource flow provided by the provider client; and a transaction management module configured to generate certificate information indicative of a status of a resource flow usage according to a preset rule, and send the certificate information to the blockchain server, to cause the blockchain server to determine a first value indicative of a value added by the requester client to an account of the provider client based on the certificate information.

Optionally, the transaction establishment module being configured to select a provider client and establish an association with the provider client through a blockchain server includes: the transaction establishment module being configured to: acquire resource flow release information of a plurality of provider clients, wherein the resource flow release information includes identification information of the provider clients and price information of the resource flow; and select a provider client based on the resource flow release information, and send transaction request information to the blockchain server, wherein the transaction request information is forwarded by the blockchain server to the provider client selected, to cause the provider client to begin to provide the resource flow in a case where the transaction request information is permitted.

Optionally, the transaction request information includes a digital signature of the requester client, and the blockchain server forwards the transaction request information to the provider client in a case where the transaction request information is verified to be true based on the digital signature of the requester client.

Optionally, the transaction management module being configured to generate certificate information indicative of a status of a resource flow usage according to a preset rule and send the certificate information to the blockchain server includes: the transaction management module being configured to during using of the resource flow, generate a resource flow usage certificate indicative of a current usage status every preset time interval, and send the resource flow usage certificate to the provider client, to cause the provider client to send the resource flow usage certificate to the blockchain server.

Optionally, the resource flow usage certificate includes a digital signature of the requester client, and the provider client sends the resource flow usage certificate to the blockchain server in a case where the resource flow usage certificate is verified to be true based on the digital signature of the requester client.

Optionally, the resource flow includes at least one of a network traffic resource, a power resource, a computing power resource, and/or a designated data flow resource with a real-time dynamic status.

Another aspect of the present disclosure provides an apparatus for transacting a resource flow applied to a provider client, including: a transaction establishment module configured to establish an association with a requester client through a blockchain server, and provide a resource flow to the requester client, to cause the requester client to receive and use the resource flow; and a transaction management module configured to acquire certificate information indicative of a status of a resource flow usage of the requester client, and send the certificate information to the blockchain server, to cause the blockchain server to determine a first value indicative of a value added to the provider client by the requester client based on the certificate information.

Optionally, the transaction establishment module being configured to establish an association with a requester client through a blockchain server and provide a resource flow to the requester client includes: the transaction establishment module being configured to: receive transaction request information sent by the blockchain server, wherein the transaction request information includes identification information of the requester client and a digital signature of the requester client, and the transaction request information is sent from the requester client to the blockchain server; and send transaction permission information to the blockchain server in a case where the transaction request information is permitted, and begin to provide the resource flow to the requester client, wherein the transaction permission information includes the transaction request information and a digital signature of the provider client.

Optionally, the transaction request information further includes an estimated total amount of the resource flow to be used; and the transaction establishment module is further configured to permit the transaction request information in a case where the estimated total amount of the resource flow to be used is not greater than a total amount of the resource flow to be provided.

Optionally, the transaction management module being configured to acquire certificate information indicative of a status of a resource flow usage of the requester client, and send the certificate information to the blockchain server includes: the transaction management module being configured to: receive a resource flow usage certificate sent by the requester client; and determine an end of using of the resource flow by the requester client in a case where the resource flow usage certificate is not received after exceeding a predetermined period of time, and send the resource flow usage certificate received to the blockchain server.

Optionally, the resource flow usage certificate sent by the requester client includes a digital signature of the requester client, and the transaction management module is further configured to verify the resource flow usage certificate based on the digital signature of the requester client, and send the resource flow usage certificate to the blockchain server in response to verifying of the resource flow usage certificate being true; and/or the transaction management module is further configured to send the resource flow usage certificate and the digital signature of the provider client to the blockchain server.

Optionally, the resource flow includes at least one of a network traffic resource, a power resource, a computing power resource, and/or a designated data flow resource with a real-time dynamic status.

Another aspect of the present disclosure provides a computer equipment, including a memory, a processor, and a computer program stored in the memory and executable on the processor, wherein the computer program, when executed by the processor, cause the processor to perform above-mentioned methods for transacting a resource flow.

Another aspect of the present disclosure provides a computer-readable medium having executable instructions stored thereon, wherein the executable instructions, when executed by a processor, cause the processor to perform above-mentioned methods for transacting a resource flow.

Another aspect of the present disclosure provides a computer program including computer-executable instructions, wherein the instructions, when executed, perform above-mentioned methods for transacting a resource flow.

According to the embodiments of the present disclosure, the problem of cheating by any one or more parties of the requester and the provider in the process of transacting a resource flow may be at least partially solved, mitigated, inhibited, or even avoided. The blockchain server acting as a third party participates in the resource flow transaction from the beginning to the end. Further, since the blockchain server is an any node in the blockchain network, the behavior of any blockchain server is witnessed by multiple other blockchain servers in the blockchain network, thus forming a multi-party trusted supervision of the transaction behavior of the resource flow. None of the requester, the provider and the blockchain server in the blockchain network can cheat, and a fair transaction mode of the resource flow is achieved.

BRIEF DESCRIPTION OF THE DRAWINGS

The above and other objectives, features and advantages of the present disclosure will be more apparent through the following description of embodiments of the present disclosure with reference to the drawings, in which.

DETAILED DESCRIPTION

Embodiments of the present disclosure will be described below with reference to the drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. Obviously, however, one or more embodiments may also be implemented without these specific details. In addition, in the following description, descriptions of well-known structures and technology are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have meanings generally understood by those skilled in the art, unless otherwise defined. It should be noted that the terms used herein shall be interpreted to have meanings consistent with the context of this specification, and shall not be interpreted in an idealized or too rigid way.

In a case where the expression similar to "at least one of A, B and C" is used, it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C). In a case where the expression similar to "at least one of A, B and C" is used, it should be explained according to the meaning of the expression generally understood by those skilled in the art (for example, "a system having at least one of A, B or C" should include but not be limited to a system having only A, a system having only B, a system having only C, a system having A and B, a system having A and C, a system having B and C, and/or a system having A, B and C). Those skilled in the art should also understand that essentially any transitional conjunctions and/or phrases representing two or more optional items, whether in the specification, claims or drawings, should be understood to give the possibility of including one, either or both of the items. For example, the phrase "A or B" should be understood to give the possibility of including "A," or "B", or "A and B".

Figure 1:
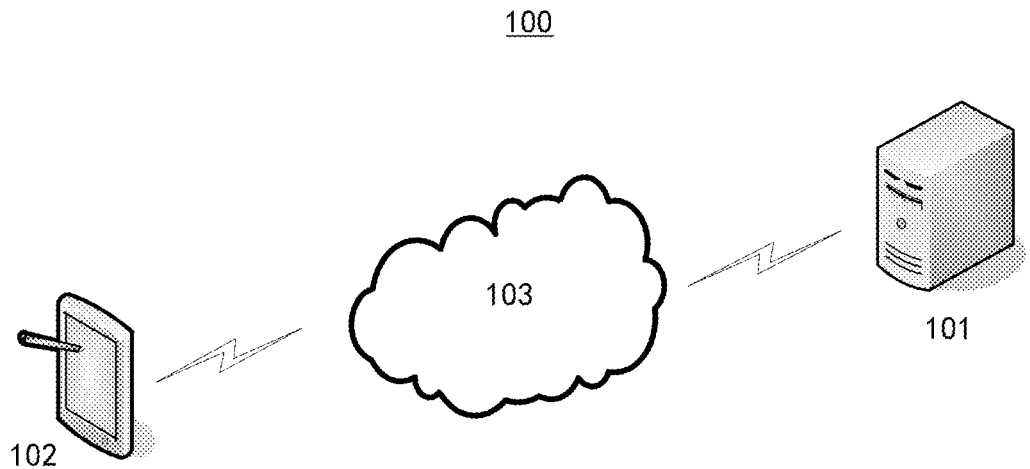
FIG. 1 schematically shows an exemplary system architecture to which a method and an apparatus for transacting a resource flow may be applied according to embodiments of the present disclosure.

FIG. 1 schematically shows an exemplary system architecture to which a method and an apparatus for transacting a resource flow may be applied according to embodiments of the present disclosure. It should be noted that FIG. 1 is only an example of a system architecture in which the embodiments of the present disclosure may be applied, to help those skilled in the art to understand the technical content of the present disclosure. It does not mean that the embodiments of the present disclosure may not be applied to other devices, systems or scenes.

As shown in FIG. 1, the system architecture 100 according to the embodiment may include a computer equipment 101, a computer equipment 102, and a network 103. In FIG. 1, the computer equipment 101 is shown as a server. In other embodiments, the computer equipment 101 may be a terminal equipment installed with various client applications, including but not limited to a smart phone, a tablet computer, a laptop computer, a desktop computer, and so on. The computer equipment 101 may also be a server for providing various services. In FIG. 1, the computer equipment 102 is shown as a terminal equipment. In other embodiments, the computer equipment 102 may be a terminal equipment installed with various client applications, including but not limited to a smart phone, a tablet computer, a laptop computer, a desktop computer, and so on. The computer equipment 102 may also be a server for providing various services. The network 103 may be a medium for providing a communication link between the computer equipment 101 and the computer equipment 102. The network 103 may include various connection types, such as wired or wireless communication links, fiber-optic cables, and so on.

The computer equipment 101 may transact a resource flow with the computer equipment 102 through the network 103. For example, the computer equipment 101 may act as a requester that needs to use a resource flow, and the computer equipment 102 may act as a provider that can provide the resource flow. After the resource flow transaction begins, the computer equipment 102 provides corresponding resource flow to the computer equipment 101, and the computer equipment 101 receives and uses the resource flow. When the computer equipment 101 stops using the resource flow, the computer equipment 101 needs to pay corresponding transaction fee to the computer equipment 102 according to a total amount of the resource flow used. The transaction ends after the transaction fee is paid. Similarly, the computer equipment 102 may act as a requester that needs to use the resource flow, and the computer equipment 101 may act as a provider that can provide the resource flow. After the resource flow transaction begins, the computer equipment 101 provides corresponding resource flow to the computer equipment 102, and the computer equipment 102 receives and uses the resource flow. When the computer equipment 102 stops using the resource flow, the computer equipment 102 needs to pay corresponding transaction fee to the computer equipment 101 according to a total amount of the resource flow used. The transaction ends after the transaction fee is paid.

It should be understood that the type and number of the computer equipment and network in FIG. 1 are merely illustrative. According to implementation needs, there may be any type and number of computer equipment and network.

Figure 2:
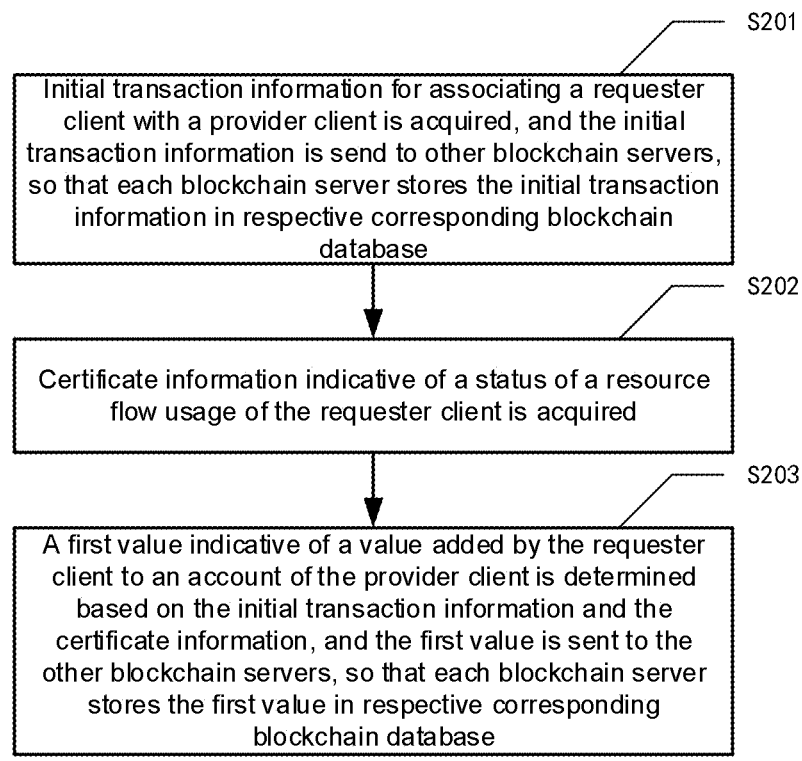
FIG. 2 schematically shows a flowchart of a method for transacting a resource flow according to embodiments of the present disclosure.

FIG. 2 schematically shows a flowchart of a method for transacting a resource flow according to embodiments of the present disclosure. The method is applied to a blockchain server and illustrates a process of transacting a resource flow provided by the present disclosure from the perspective of the blockchain server.

As shown in FIG. 2, the method includes operation S201. In operation S201, initial transaction information for associating a requester client with a provider client is acquired, and the initial transaction information is send to other blockchain servers, so that each blockchain server stores the initial transaction information in respective corresponding blockchain database.

In this operation, the initial transaction information is used to establish association between corresponding requester client and provider client before the transaction begins. The requester client is a party that needs to purchase the resource flow, and the provider client is a party that may provide the resource flow. A plurality of blockchain servers form a blockchain network, and each blockchain server has a corresponding blockchain database. The data stored in each blockchain database keeps to be consistent, and multi-party supervision to the data stored in the blockchain database by the plurality of blockchain servers makes the data in the blockchain database immutable once it is stored.

Then, in operation S202, certificate information indicative of a status of a resource flow usage of the requester client is acquired.

In operation S203, a first value indicative of a value added by the requester client to an account of the provider client is determined based on the initial transaction information and the certificate information, and the first value is sent to the other blockchain servers, so that each blockchain server stores the first value in respective corresponding blockchain database.

In this operation, the first value represents a transaction fee that the requester client needs to pay to the provider client after the transaction ends. In this solution, the transaction fee is paid with a predetermined digital currency. For any node, whether it is any requester client, any provider client, and/or any blockchain server, a total value in its account represents a total amount of digital currency owned by the node. Accordingly, the first value represents a value that needs to be decreased from the account of the requester client and/or that needs to be added to the account of the provider client after the transaction ends. The first value is also recorded in the blockchain database by the blockchain server.

Therefore, according to the method shown in FIG. 2, in a process of creating and conducting the resource flow transaction between the requester client and the provider client, before the transaction begins, the initial transaction information for associating the requester client with the provider client is recorded in the blockchain database through the blockchain network formed by the blockchain servers. During the transaction, the certificate information indicative of the status of the resource flow usage of the requester client is acquired to monitor the status of the transaction. After the transaction ends, the fee that the requester client needs to pay to the provider client in this transaction is determined based on the initial transaction information and the certificate information, and fee information about the transaction is recorded in the blockchain database through the blockchain network. According to this method, relevant information from the beginning to the end of the resource flow transaction is recorded in the blockchain database. Based on the immutability of the data in the blockchain database, the permanent authenticity of the transaction-related information is guaranteed. None of the requester, the provider and the blockchain server in the blockchain network can cheat, a trusted multi-party supervision of the resource flow transaction behavior is formed, and a fair transaction mode of the resource flow is achieved.

It should be noted that the resource flow in the embodiment of the present disclosure refers to a resource that may be provided continuously and in a flow and consumed with the usage, such as a network traffic resource, a power resource, a computing power resource, and a designated data flow resource with a real-time dynamic status. Various flow-type consumable resources with such characteristics may act as the resource flow in the embodiments of the present disclosure, which is not limited here. Based on the above characteristics of the resource flow, the transaction of the resource flow often begins with the beginning of the use of the resource flow and ends with the end of the use of the resource flow. Therefore, the transaction fee corresponding to the resource flow transaction often needs to be obtained after the end of the transaction. Moreover, the corresponding transaction fee is calculated based on the total amount of the resource flow used.

In an embodiment of the present disclosure, the operation S201 of acquiring initial transaction information for associating a requester client with a provider client of the method shown in FIG. 2 may include the following. Firstly, transaction request information sent by the requester client is received. The transaction request information includes identification information of the requester client, identification information of the provider client, and a digital signature of the requester client. Secondly, the transaction request information is verified based on the digital signature of the requester client. If it is verified that that the transaction request information is true, the transaction request information is sent to the provider client. Next, transaction permission information sent for the transaction request information by the provider client is received. The transaction permission information includes the transaction request information and the digital signature of the provider client. The transaction permission information is verified based on the digital signature of the provider client. If it is verified that the transaction permission information is true, the transaction permission information is used as the initial transaction information for associating the requester client with the provider client.

In this embodiment, the transaction request information sent by the requester client is request information sent by the requester client to initiate a transaction in order to obtain the resource flow. The identification information of the requester client in the transaction request information indicates an identity of the requester client. The identification information of the provider client indicates identity information corresponding to one or more provider clients actively or passively selected by the requester client when initiating the transaction request. The digital signature of the requester client is used to prove authenticity of the transaction request information. The transaction request information is verified based on the digital signature of the requester client. If the digital signature is verified to be true, it means that the transaction request information is true and valid, then the transaction request information is forwarded to the corresponding provider client so that the provider client may determine whether to conduct a transaction. If the digital signature is verified to be false, it means that the transaction request information is forged, then no subsequent processing is performed on the transaction request information, so that an abnormal transaction cannot be established. After the transaction request information is forwarded to the corresponding provider client, if transaction permission information returned by the provider client is received, it means that the provider client agrees to conduct the transaction. In addition to the original transaction request information, the transaction permission information further includes a digital signature of the provider client for proving the authenticity of the transaction permission information. The transaction permission information is verified based on the digital signature of the provider client. If the digital signature is verified to be true, it means that the transaction permission information is true and valid. Subsequently, the transaction permission information is used as the initial transaction information of the transaction and stored in the blockchain database. If the digital signature is verified to be false, it means that the transaction permission information is forged, then no subsequent processing is performed on the transaction permission information, and it is considered as the case that no initial transaction information is acquired, so that an abnormal transaction cannot be established. Therefore, in this embodiment, the blockchain server serves as the third-party trusted supervision in the construction of the initial transaction information, and the authenticity of the process is verified by the digital signatures of both parties of the transaction, which ensures that the transaction is fair, true and effective from the beginning of establishment. When the initial transaction information is stored in the blockchain database, it is indicated that the transaction has been established.

As an optional embodiment, since the transaction permission information returned by the provider client for the transaction request information includes the transaction request information and the digital signature of the provider client, and the transaction request information includes the digital signature of the requester client, after the transaction permission information is received, in order to verify the authenticity of the transaction permission information more reliably, the transaction permission information may be verified not only based on the digital signature of the provider client in the transaction permission information but also based on the digital signature of the requester provider in the transaction request information in the transaction permission information, so as to ensure that the transaction request information in the transaction permission information has not been tampered with or forged.

Specifically, in this embodiment, asymmetric encryption may be used to form the digital signatures of both parties of the transaction. For any requester client, the requester client corresponds to a unique key pair including a public key and a private key. The public key of the requester client may be public, that is, it may be obtained by other requester clients, each provider client, and/or each blockchain server. The private key is non-public and cannot be obtained by any other party, that is, it can only be used by the requester client. Similarly, any provider client has a dedicated key pair, and any blockchain server may also have a dedicated key pair. The digital signature of the requester client in the transaction request information may be obtained by encryption of the transaction request information based on the private key of the requester client, and the blockchain server may verify the digital signature with the public key of the requester client to prove the authenticity of the transaction request information. The digital signature of the provider client in the transaction permission information may be obtained by encryption of the transaction permission information based on the private key of the provider client, and the blockchain server may verify the digital signature with the public key of the provider client to prove the authenticity of the transaction permission information. In other embodiments, both parties of the transaction may also use other methods to form their respective digital signatures, as long as the method may achieve the objective of proving the authenticity of the information to the plurality of blockchain servers serving as the third party, which is not limited here.

In the above process of acquiring the initial transaction information, as an optional embodiment, the transaction request information received by the blockchain server further includes price information of the resource flow in addition to the identification information of the requester client, the identification information of the provider client and the digital signature of the requester client. The price information of the resource flow in the transaction request information may be used as reference information when the provider client determines whether to conduct the transaction, and, after the provider client agrees to conduct the transaction and returns the transaction permission information, the price information of the resource flow as the price information carried in the initial transaction information is stored in the blockchain database as an official transaction price of the transaction. The certificate information acquired by the blockchain server is used to prove the quantity of the resource flow used by the requester client. The operation S203 of determining a first value based on the initial transaction information and the certificate information of the method shown in FIG. 2 includes: determining a total amount of THE resource flow used by the requester client based on the certificate information, and determining the first value based on the price information of the resource flow and the total amount of THE resource flow used by the requester client.

In an embodiment of the present disclosure, the requester client may prepay a transaction deposit before the beginning of the transaction, that is, the transaction request information received by the blockchain server further includes a second value indicative of a value decreased from the account of the requester client. It means that the requester client prepaid the second value of digital currency as the deposit for this transaction. When the provider client agrees to conduct the transaction, the second value as information carried in the initial transaction information is stored in the blockchain database. Multiple parties may witness the event that the requester party prepaid the second value of deposit, which may ensure safety, effectiveness and traceability. The process of using the deposit prepaid by the requester client to pay the transaction fee may be performed in the following manner. That is, the operation S203 of determining the first value based on the initial transaction information and the certificate information further includes: determining a third value indicative of a value added to the account of the requester client if the second value is greater than the first value, wherein the third value is equal to difference between the second value and the first value; determining a fourth value indicative of a value decreased from the account of the requester client if the second value is less than the first value, wherein the fourth value is equal to difference between the first value and the second value; and sending the third value or the fourth value determined to the other blockchain servers, so that each blockchain server stores the third value or the fourth value in the respective corresponding blockchain database.

The first value represents the transaction fee that the requester client needs to pay to the provider client, and the second value represents the deposit prepaid by the requester client. When the second value is greater than the first value, it means that the deposit prepaid by the requester client is more than the transaction fee, then the difference between the second value and the first value represents a balance of the deposit prepaid by the requester client minus the transaction fee. The balance may be refunded directly to the account of the requester client. The value added to the account of the requester client in the refund exactly corresponds to the third value. Storage of the third value in the blockchain database also ensures the safety, effectiveness and traceability of the refund process of the excess deposit. When the second value is less than the first value, it means that the deposit prepaid by the requester client is less than the transaction fee, then the difference between the first value and the second value represents a deficiency after the transaction fee minus the deposit prepaid by the requester client. The deficiency needs to be supplemented by the requester client, and the corresponding value decreased from the account of the requester client to supplement the deficiency corresponds to the fourth value. Storage of the fourth value in the blockchain database also ensures the safety, effectiveness and traceability of the supplementary of deficiency. Therefore, this embodiment actually describes a complete solution of a refund for any overpayment or a supplemental payment for any deficiency regarding the deposit prepaid by the requester client.

In another embodiment of the present disclosure, the requester client also prepaid the transaction deposit before the beginning of the transaction, and the transaction request information further includes the second value indicative of a value decreased from the account of the requester client. The process of using the deposit prepaid by the requester client to pay the transaction fee may be performed in the following manner. That is, the operation S203 of determining a first value based on the initial transaction information and the certificate information further includes: recording difference between the second value and the first value as a fifth value if the second value is greater than the first value, adding the fifth value to the second value corresponding to a next transaction of resource flow in a case where the next transaction of the resource flow is conducted by the requester client, and obtaining an updated second value corresponding to the next transaction of the resource flow.

The first value represents the transaction fee that the requester client needs to pay to the provider client, and the second value represents the deposit prepaid by the requester client. When the second value is greater than the first value, it means that the deposit prepaid by the requester client is more than the transaction fee, then the difference between the second value and the first value represents a balance of the deposit prepaid by the requester client minus the transaction fee. The balance may be reserved as a deposit for the next transaction of the requester provider, which is recorded as the fifth value. In the next resource flow transaction of the requester client, if the deposit newly paid by the requester client also corresponds to the second value, the fifth value remaining before is added to the second value newly paid to obtain the current total value of deposit, and the current total value of deposit is used to pay for a new transaction fee. Preferably, the fifth value recorded each time and the updated second value may be stored in the blockchain database for recording, so as to ensure the safety, effectiveness and traceability of the continued use of the remaining deposit.

In an embodiment of the present disclosure, the operation S202 of acquiring certificate information indicative of a status of a resource flow usage of the requester client of the method shown in FIG. 2 includes: receiving the resource flow usage certificate sent by the provider client, wherein the resource flow usage certificate further includes the digital signature of the requester client and the digital signature of the provider client in addition to the information for proving the quantity of the resource flow used by the requester client, and the resource flow usage certificate is sent by the requester client to the provider client; verifying the resource flow usage certificate based on the digital signature of the requester client and the digital signature of the provider client; and using the resource flow usage certificate as the certificate information indicative of the status of the resource flow usage of the requester client if it is verified that the resource flow usage certificate is true. Therefore, on the one hand, the resource flow usage certificate in this embodiment is sent from the requester client to the provider client and then sent by the provider client to the blockchain server, and the safety of the resource flow usage certificate is maintained through the common witness of the three parties. On the other hand, in this embodiment, the authenticity of the resource flow usage certificate is verified through the digital signatures of both parties of the transaction, which ensures the authenticity of the certificate information, further ensures the fairness and effectiveness of the transaction fee finally determined based on the certificate information, and therefore ensures the fairness of the transaction.

Specifically, in this embodiment, the digital signatures of both parties of the transaction may also be formed by using the above-described asymmetric encryption. For example, the requester client may encrypt the resource flow usage certificate based on the private key of the requester client so as to obtain the digital signature of the requester client, and the provider client may encrypt the resource flow usage certificate and the digital signature of the requester client based on the private key of the provider client so as to obtain the digital signature of the provider client. The blockchain server may verify the authenticity of the digital signature of the requester client and the digital signature of the provider client by using the public key of the requester client and the public key of the provider client so as to prove the authenticity of the transaction request information.

Figure 3:
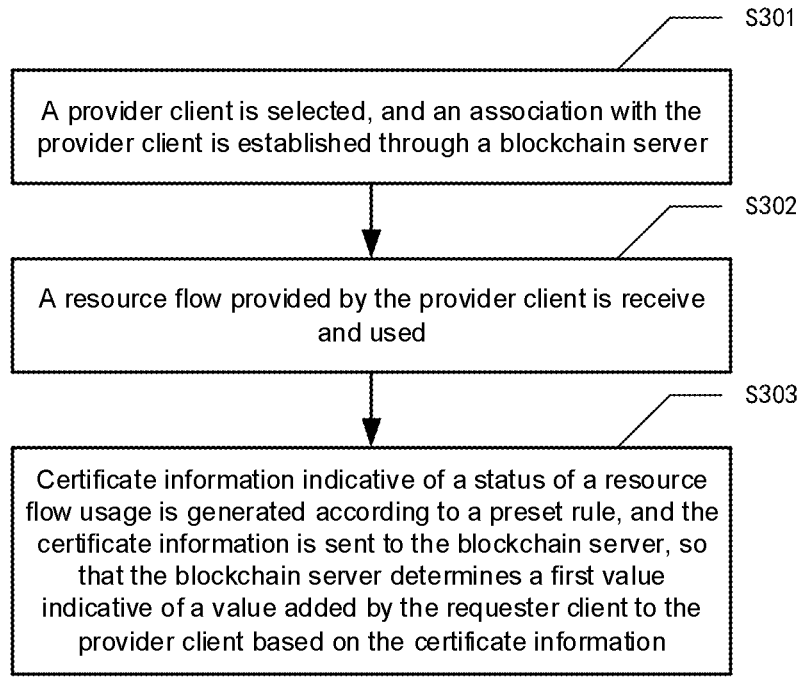
FIG. 3 schematically shows a flowchart of a method for transacting a resource flow according to other embodiments of the present disclosure.

FIG. 3 schematically shows a flowchart of a method for transacting a resource flow according to another embodiment of the present disclosure. The method is applied to the requester client and illustrates the resource flow transaction process provided by the present disclosure from the perspective of the requester client.

As shown in FIG. 3, the method includes the following operations.

Operation S301: A provider client is selected, and an association with the provider client is established through a blockchain server.

Operation S302: A resource flow provided by the provider client is receive and used.

Operation S303: Certificate information indicative of a status of a resource flow usage is generated according to a preset rule, and the certificate information is sent to the blockchain server, so that the blockchain server determines a first value indicative of a value added by the requester client to the provider client based on the certificate information.

In the method shown in FIG. 3, before the beginning of the transaction, the association with the provider client selected is established through the blockchain server to conduct the transaction, during the transaction, the certificate information is sent to the blockchain server so that the blockchain server monitors the status of the transaction, and after the end of the transaction, the transaction fee is determined through the blockchain server for payment. According to this method, the blockchain server as a third party participates in the resource flow transaction from the beginning to the end. Further, since the blockchain server is any node in the blockchain network, the behavior of any blockchain server is witnessed by multiple other blockchain servers in the blockchain network, thus forming a multi-party trusted supervision of the transaction behavior of the resource flow. None of the requester, the provider and the blockchain server in the blockchain network can cheat, and a fair transaction mode of the resource flow is achieved.

As described above, the resource flow in the embodiment of the present disclosure refers to a resource that may be provided continuously and in a flow and consumed with usage, such as a network traffic resource, a power resource, a computing power resource, and a designated data flow resource with a real-time dynamic status, which is not limited here.

In an embodiment of the present disclosure, the operation S301 of selecting a provider client and establishing an association with the provider client through the blockchain server of the method shown in FIG. 3 includes: acquiring resource flow release information of a plurality of provider clients, wherein the resource flow release information includes identification information of the provider client and price information of the resource flow, selecting a provider client based on the resource flow release information, and sending transaction request information to the blockchain server, wherein the transaction request information is forwarded by the blockchain server to the provider client selected, so that the provider client begins to provide the resource flow in a case where the transaction request information is permitted.

According to this embodiment, any provider client may issue resource flow release information according to the characteristics of its own resource flow, and the resource flow release information may be acquired by any requester client. The resource flow release information may include the type, quantity, price and other related information of the resource flow to be provided. Any requester client may select an appropriate provider client according to its own needs. After the provider client is selected, the transaction request information is sent to the selected provider client through the blockchain server. The resource flow transaction may be conducted after obtaining the permission of the provider client.

As an optional embodiment, the transaction request information sent by the request client after selecting the provider client may include the digital signature of the requester client, so that the blockchain server forwards the transaction request information to the provider client after verifying of the transaction request information being true based on the digital signature of the requester client. Therefore, in this embodiment, the authenticity of the transaction request information may be proved through the digital signature of the requester client carried in the transaction request information, and the transaction request information may be forwarded to the provider client through the blockchain server only if the transaction request information is true, and then the corresponding transaction may be conducted.

Specifically, the digital signature of the requester client may be formed by asymmetric encryption. For example, the requester client may encrypt the transaction request information based on its private key so as to obtain the digital signature of the requester client. The blockchain server may verify the authenticity of the transaction request information by using the public key corresponding to the requester client, which is described above and will not be repeated here.

In an embodiment of the present disclosure, the operation S303 of generating certificate information indicative of a status of a resource flow usage according to a preset rule and sending the certificate information to the blockchain server of the method shown in FIG. 3 includes: during using of the resource flow, generating a resource flow usage certificate indicative of a current usage status every preset time interval, and sending the resource flow usage certificate to the provider client, so that the resource flow usage certificate is sent to the blockchain server by the provider client. In other words, the certificate information is generated by the requester client, sent from the requester client to the provider client, and then sent from the provider client to the blockchain server in the blockchain network, thus forming a common witness of the certificate information by multiple parties. In this embodiment, resource flow usage certificates are generated over time. The provider client may send all the resource flow usage certificates received to the blockchain server, or send one or more thereof to the blockchain server, for example, send the last resource flow usage certificate generated by the requester client to the blockchain server.

For example, the requester client may generate a resource flow usage certificate every preset time interval T after beginning to use the resource flow and send the resource flow usage certificate to the provider client of providing the resource flow. The resource flow usage certificate may record the information such as the quantity of the resource flow that has been used by the requester client, so that the corresponding provider client may know the current status and situation of the resource flow usage of the requester client, and stop a supply of the resource flow in time when the requester client no longer uses the resource flow, and subsequently calculate the corresponding transaction fee based on the total amount of the resource flow used by the requester client.

Further, in order to increase the credibility of the certificate information and prevent the certificate information from being falsified or tampered with during transmission, as an optional embodiment, the resource flow usage certificate further includes the digital signature of the requester client in addition to the information indicative of the status of the resource flow usage, so that the provider client sends the resource flow usage certificate to the blockchain server after it is verified that the resource flow usage certificate is true based on the digital signature of the requester client. In this embodiment, the digital signature of the requester client is added to the resource flow usage certificate to prove the authenticity of the resource flow usage certificate, and only if the resource flow usage certificate is true, the provider client sends the resource flow usage certificate to the blockchain server and the resource flow usage certificate is considered valid.

Specifically, the digital signature of the requester client may be formed by asymmetric encryption. For example, the requester client may encrypt the resource flow usage certificate based on its private key so as to obtain the digital signature of the requester client, and the provider client may verify the authenticity of the resource flow usage certificate by using the public key corresponding to the requester client, which is described above and will not be repeated here.

Figure 4:
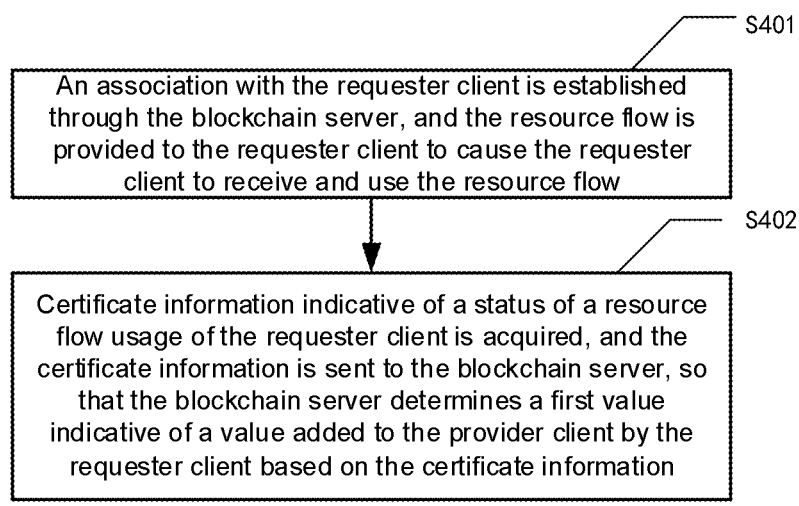
FIG. 4 schematically shows a flowchart of a method for transacting a resource flow according to other embodiments of the present disclosure.

FIG. 4 schematically shows a flowchart of a method for transacting a resource flow according to another embodiment of the present disclosure. The method is applied to the provider client and illustrates the resource flow transaction process provided by the present disclosure from the perspective of the provider client.

As shown in FIG. 4, the method includes the following operations.

Operation S401: An association with the requester client is established through the blockchain server, and the resource flow is provided to the requester client to cause the requester client to receive and use the resource flow.

Operation S402: Certificate information indicative of a status of a resource flow usage of the requester client is acquired, and the certificate information is sent to the blockchain server, so that the blockchain server determines a first value indicative of a value added to the provider client by the requester client based on the certificate information.

In the method shown in FIG. 4, before the beginning of the transaction, an association with the corresponding requester client is established through the blockchain server, during the transaction, the certificate information is sent to the blockchain server so that the blockchain server monitors the status of the transaction, and after the end of the transaction, the transaction fee is determined through the blockchain server so that the request client may make a payment. According to this method, the blockchain server as a third party participates in the resource flow transaction from the beginning to the end. Further, since the blockchain server is any node in the blockchain network, the behavior of any blockchain server is witnessed by multiple other blockchain servers in the blockchain network, thus forming a multi-party trusted supervision of the transaction behavior of the resource flow. None of the requester, the provider and the blockchain server in the blockchain network can cheat, and a fair transaction mode of the resource flow is achieved.

As described above, the resource flow in the embodiment of the present disclosure refers to a resource that may be provided continuously and in a flow and consumed with usage, such as a network traffic resource, a power resource, a computing power resource, and a designated data flow resource with a real-time dynamic status, which is not limited here.

In an embodiment of the present disclosure, the operation S401 of establishing an association with the requester client through the blockchain server and providing the resource flow to the requester client of the method shown in FIG. 4 further includes: receiving transaction request information sent by the blockchain server, wherein the transaction request information includes the identification information of the requester client and the digital signature of the requester client, and the transaction request information is sent by the requester client to the blockchain server; sending transaction permission information to the blockchain server in a case where the transaction request information is permitted, wherein the transaction permission information includes the transaction request information and the digital signature of the provider client; and beginning to provide the resource flow to the requester client.

According to this embodiment, after the requester client selects the provider client according to its own needs, the transaction request information expressing the demand of resource flow transaction is sent to the provider client through the blockchain server. The provider client may determine whether to permit the transaction request information according to its own needs. If permitting, the corresponding transaction permission information is sent to the blockchain server, that is, the association between the requester client and the provider client is established, and the transaction may be conducted. If not permitting, no subsequent processing is performed, that is, no association between the requester client and the provider client is established, and the transaction cannot be conducted. The transaction request information contains the digital signature of the requester client used to prove the authenticity of the transaction request information, and the blockchain server may verify the transaction request information based on the digital signature of the requester client before the transaction request information is forwarded to the provider client. Alternatively, it may be the provider client that verifies the authenticity of the transaction request information based on the digital signature of the requester client after receiving the transaction request information, and then considers whether to permit after the transaction request information is verified to be true. The transaction permission information contains the digital signature of the provider client used to prove the authenticity of the transaction permission information, and the blockchain server may verify the transaction permission information based on the digital signature of the provider client. Alternatively, the blockchain server may verifies the authenticity of the transaction permission information not only through the digital signature of the provider client, but also through the digital signature of the requester client in the transaction request information carried in the transaction permission information.

Specifically, the digital signature of the requester client and/or the digital signature of the provider client may be formed by asymmetric encryption, which is described above and will not be repeated here.

Further, as an optional embodiment, the transaction request information sent by the requester client further includes an estimated total amount of the resource flow to be used. After the transaction request information is forwarded to the provider client by the blockchain server, the provider client may determine whether it can meet such a supply demand based on the estimated total amount of the resource flow to be used, that is, the estimated total amount of the resource flow to be used acts as a reference for determining whether to permit the transaction. In other words, the operation S401 of establishing an association with the requester client through the blockchain server further includes: permitting the transaction request information if the estimated total amount of the resource flow to be used is not greater than a total amount of the resource flow to be provided.

In an embodiment of the present disclosure, the operation S402 of acquiring certificate information indicative of a status of a resource flow usage of the requester client and sending the certificate information to the blockchain server of the method shown in FIG. 4 includes: receiving the resource flow usage certificate sent by the requester client; determining an end of using of the resource flow by the requester client in a case where the resource flow usage certificate is not received after exceeding a predetermined period of time; and sending the resource flow usage certificate received to the blockchain server.

For example, the provider client receives a resource flow usage certificate sent by the requester client every preset time interval. The resource flow usage certificate records the status information such as the quantity of the resource flow that has been used. After receiving a resource flow usage certificate, if the provider client does not receive the resource flow usage certificate after a predetermined period of time, it means that the requester client has stopped using the resource flow. Then the provider client may stop the supply of the resource flow, and the transaction fee may be settled through the blockchain server.

Further, in order to improve the credibility of the certificate information, the resource flow usage certificate sent by the requester client may further include the digital signature of the requester client in addition to the information indicative of the status of the resource flow usage. The digital signature is used to prove the authenticity of the resource flow usage certificate. Accordingly, the operation S402 of sending the resource flow usage certificate received to the blockchain server further includes: verifying the resource flow usage certificate based on the digital signature of the requester client, and sending the resource flow usage certificate to the blockchain server in response to verifying of the resource flow usage certificate being true; and/or, the operation S402 of sending the resource flow usage certificate received to the blockchain server further includes: sending the resource flow usage certificate and the digital signature of the provider client to the blockchain server, so that the blockchain server may verify the authenticity of the resource flow usage certificate based on the digital signature of the provider client and/or the digital signature of the requester client. In this embodiment, the digital signature of the requester client and the digital signature of the provider client are added to the resource flow usage certificate to prove the authenticity of the resource flow usage certificate, and only if the resource flow usage certificate is true, the resource flow usage certificate is considered valid, and the blockchain server may use the resource flow usage certificate for transaction settlement.

Specifically, the digital signature of the requester client and/or the digital signature of the provider client may be formed by asymmetric encryption, which is described above and will not be repeated here.

The methods shown in FIGS. 2 to 4 will be further described below in conjunction with specific embodiments by referring to FIG. 5.

Figure 5:
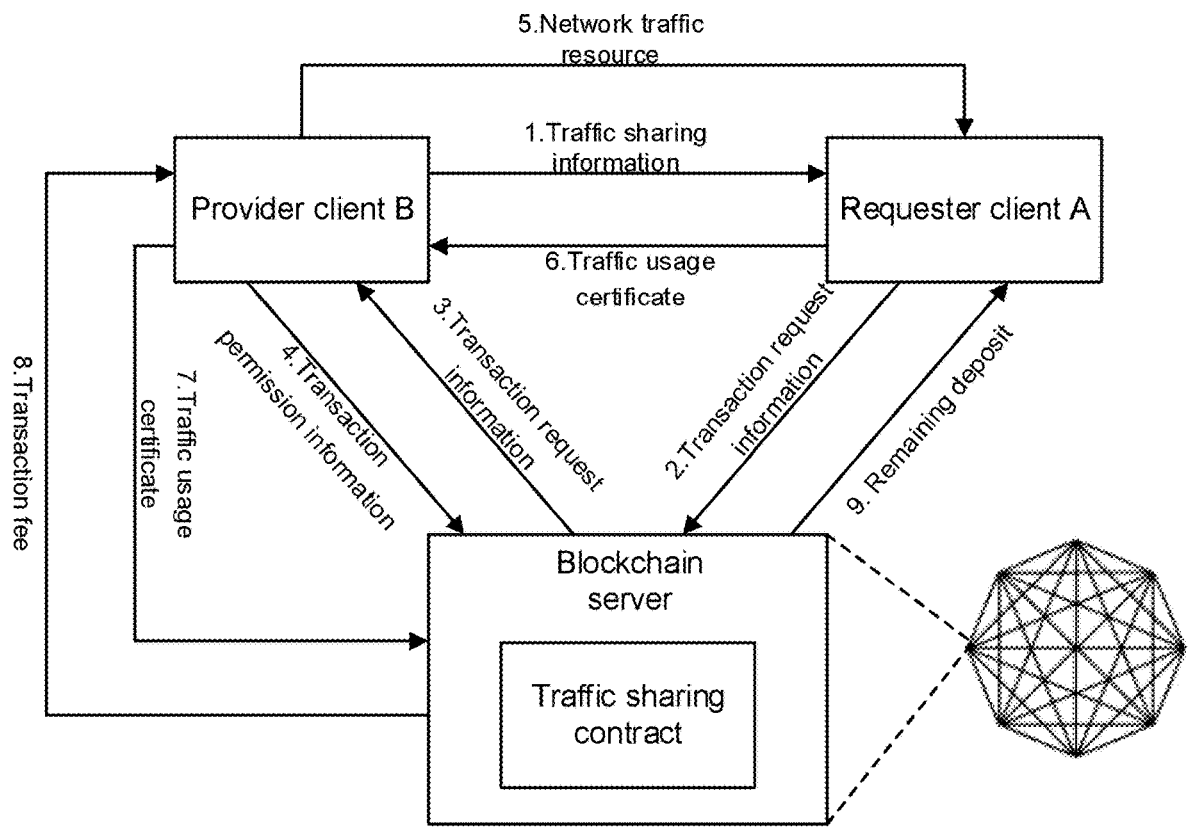
FIG. 5 schematically shows a diagram of a process of transacting a resource flow according to embodiments of the present disclosure.

FIG. 5 schematically shows a diagram of a resource flow transaction process according to an embodiment of the present disclosure.

In this embodiment, a network traffic resource is described as the resource flow, which is referred to as "traffic" hereinafter. Various other resource flow are also available. The provider client may provide a traffic, and the requester client needs to use a traffic. A plurality of blockchain servers form the blockchain network. The blockchain servers participate in the beginning, proceeding and end of the transaction between the requester client and the provider client by running a traffic sharing contract. The traffic sharing contract is essentially a smart contract, which is usually a code that is pre-installed in the blockchain database and may be triggered for execution. After the trigger conditions are met, the traffic sharing contract may be executed in the blockchain servers to perform corresponding operations. Because the smart contract stored in the blockchain database is difficult to be tampered with, the smart contract may be used to execute preset code logic, and will not be intervened by any node during the execution process, thus reliable and credible operations may be performed.

As shown in FIG. 5, a sequence of the data flows is marked in the figure with serial numbers. First, requester client A uses a dedicated channel to find the traffic sharing information issued by each provider client. The traffic sharing information corresponds to the above-described resource flow release information. The flow sharing information issued by each provider client may record one or more information for describing the characteristics of the traffic to be provided, such as a unit traffic price, a total amount of traffic to be provided, a traffic type, and the like. The requester client A may select the appropriate provider client according to its own needs. The dedicated channel used by the requester client A may be a local area network provided by the provider client that allows the requester client A to use for free under certain conditions such as a certain time and a certain place. Certainly, the dedicated channel may also be other forms, as long as it can temporarily meet the demand of the requester client A for viewing traffic sharing information.

After selecting provider client B, the requester client A generates the transaction request information. The transaction request information includes the identification information of the requester client A, the identification information of the selected provider client B, the estimated total amount of traffic to be used, and the second value indicative of the amount of deposit prepaid. The second value corresponds to the value of the digital currency decreased from the account of the requester client A. The requester client A further generates a digital signature A1 of the requester client A based on the transaction request information generated and the private key of the requester client A, and attaches the digital signature A1 to the transaction request information generated. The requester client A sends the above transaction request information to the traffic sharing contract running on the blockchain servers. After verifying that the transaction request information is true based on the public key and digital signature A1 of the requester client A, the traffic sharing contract sends the transaction request information to the provider client B. The provider client B may determine whether to permit traffic sharing to the requester client A according to the information recorded in the transaction request information. If the current traffic sharing is permitted, the provider client B may generate a digital signature B1 of the provider client B based on the transaction request information received and the private key of the provider client B, and attach the digital signature B1 to the transaction request information received to form the transaction permission information. The provider client B sends the transaction permission information to the traffic sharing contract to indicate permission of the traffic sharing and begins to provide traffic to the requester client A.

The traffic sharing contract may store the transaction permission information received in the blockchain database corresponding to each blockchain server through the consensus verification of each blockchain server, so as to obtain the joint supervision of multiple parties.

During the traffic sharing period, the requester client A periodically sends a traffic usage certificate to the provider client B. The traffic usage certificate corresponds to the above-described resource flow usage certificate. Each traffic usage certificate records the total amount of traffic used by the requester client A from the beginning of usage to a time point corresponding to the traffic usage certificate. The provider client B may know that the requester client A is still using the traffic every time it receives a traffic usage certificate. When the provider client B does not receive an updated traffic usage certificate after a predetermined period of time, the provider client B may determine that the requester client A stops using the traffic, and the provider client B may stop providing the traffic to the requester client A and submit the last traffic usage certificate to the traffic sharing contract. In this way, when the requester client A has not sent the traffic usage certificate to the provider client B for a long time, the provider client B may cut off the traffic sharing to prevent the requester client A from using the traffic without paying.

After receiving the flow usage credential submitted by the provider client B, the flow sharing contract may calculate the transaction fee corresponding to the traffic sharing, that is, the value of the digital currency the requester client A needs to pay to the provider client B, based on the traffic usage certificate and the unit traffic price. The transaction fee is represented by the first value indicative of the value added to the account of the provider client B. The above transaction fee may be deducted from the deposit prepaid by the requester client A. For example, if the second value is 200 and the first value is 150, the remaining deposit is 50 after the transaction fee is deducted from the deposit of requester client A. The remaining deposit may be processed according to the requirement of the requester client A. For example, it may be returned to the requester client A, that is, the value in the account of the requester client A is increased by 50. Alternatively, it may not be returned to the requester client A and may be reserved for the next payment of transaction fee of the requester client A. So far, the resource flow transaction process shown in FIG. 5 is completed.

Compared with the current situation that only major telecom operators provide users with network traffic resources, this example breaks the monopoly of the major telecom operators established with the help of policy, capital, user scale and other advantages, by providing traffic from the provider client to the requester client in a two-way autonomous manner. Moreover, the blockchain network is introduced to participate in the witness of transaction process, traffic pricing has become open and transparent, and traffic usage statistics are no longer calculated by the operator, but witnessed and supervised by multiple parties, which achieves the fairness and reasonableness of the flow transaction process, and meets the needs of the traffic provider and the traffic requester. The above beneficial effects may be achieved not only for the transaction of network traffic resources, but also for the transaction of other various resource flow.

Figure 6:
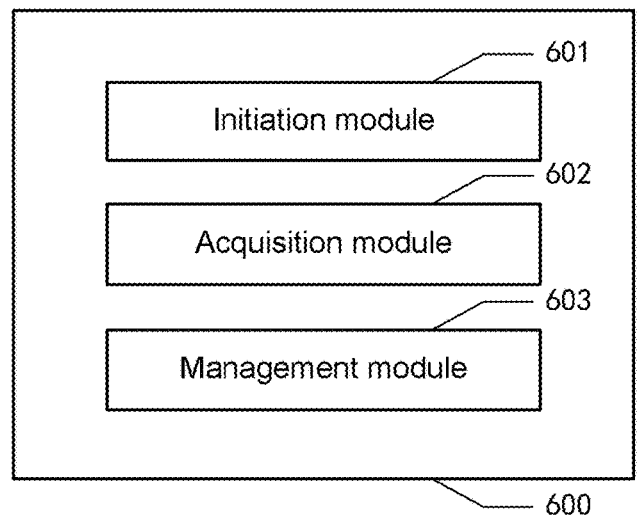
FIG. 6 schematically shows a block diagram of an apparatus for transacting a resource flow according to embodiments of the present disclosure.

FIG. 6 schematically shows a block diagram of an apparatus for transacting a resource flow according to an embodiment of the present disclosure, where the apparatus 600 for transacting a resource flow is applied to the blockchain server.

As shown in FIG. 6, the apparatus 600 for transacting a resource flow includes an initiation module 601, an acquisition module 602, and a management module 603.

The initiation module 601 is configured to acquire initial transaction information for associating the requester client with the provider client, and send the initial transaction information to other blockchain servers, so that each blockchain server stores the initial transaction information in respective corresponding blockchain database.

The acquisition module 602 is configured to acquire the certificate information indicative of the status of the resource flow usage of the requester client.

The management module 603 is configured to determine the first value indicative of the value added to the account of the provider client by the requester client based on the initial transaction information and the certificate information, and send the first value to the other blockchain servers, so that each blockchain server stores the first value in the respective corresponding blockchain database.

In an embodiment of the present disclosure, the initiation module 601 being configured to acquire initial transaction information for associating the requester client with the provider client includes: the initiation module 601 being configured to: receive transaction request information sent by the requester client, wherein the transaction request information includes identification information of the requester client, identification information of the provider client, and a digital signature of the requester client; verify the transaction request information based on the digital signature of the requester client; and send the transaction request information to the provider client in a case where the transaction request information is verified to be true; receive the transaction permission information sent by the provider client, wherein the transaction permission information includes the transaction request information and the digital signature of the provider client; verify the transaction permission information based on the digital signature of the provider client, and use the transaction permission information as the initial transaction information for associating the requester client with the provider client, in a case where the transaction permission information is verified to be true.

Further, as an optional embodiment, the transaction request information may further include price information of the resource flow. The management module 603 being configured to determine the first value based on the initial transaction information and the certificate information includes: the management module 603 being configured to determine a total amount of the resource flow used by the requester client based on the certificate information, and determine the first value based on the price information of the resource flow and the total amount of the resource flow used by the requester client.

In an embodiment of the present disclosure, the transaction request information further includes a second value indicative of the value decreased from the account of the requester client. The management module 603 is further configured to: determine the third value indicative of the value added to the account of the requester client if the second value is greater than the first value, wherein the third value is equal to difference between the second value and the first value; determine the fourth value indicative of the value decreased from the account of the requester client if the second value is less than the first value, wherein the fourth value is equal to difference between the first value and the second value; send the third value or the fourth value determined to the other blockchain servers, so that each blockchain server stores the third value or the fourth value in the respective corresponding blockchain database.

In another embodiment of the present disclosure, the transaction request information further includes the second value indicative of the value decreased from the account of the requester client. The management module 603 is further configured to: record difference between the second value and the first value as the fifth value if the second value is greater than the first value, add the fifth value to the second value corresponding to a next transaction of resource flow in a case where the next transaction of resource flow is conducted by the requester client, and obtain an updated second value corresponding to the next transaction of the resource flow.

In an embodiment of the present disclosure, the acquisition module 602 being configured to acquire certificate information indicative of the status of the resource flow usage of the requester client includes: the acquisition module 602 being configured to: receive the resource flow usage certificate sent by the provider client, wherein the resource flow usage certificate includes the digital signature of the requester client and the digital signature of the provider client, and the resource flow usage certificate is sent by the requester client to the provider client; verify the resource flow usage certificate based on the digital signature of the requester client and the digital signature of the provider client; and use the resource flow usage certificate as the certificate information indicative of the status of the resource flow usage of the requester client if it is verified that the resource flow usage certificate is true.

In the above embodiment, the resource flow may include but is not limited to at least one of a network traffic resource, a power resource, a computing power resource, and/or a designated data flow resource with a real-time dynamic status.

Figure 7:
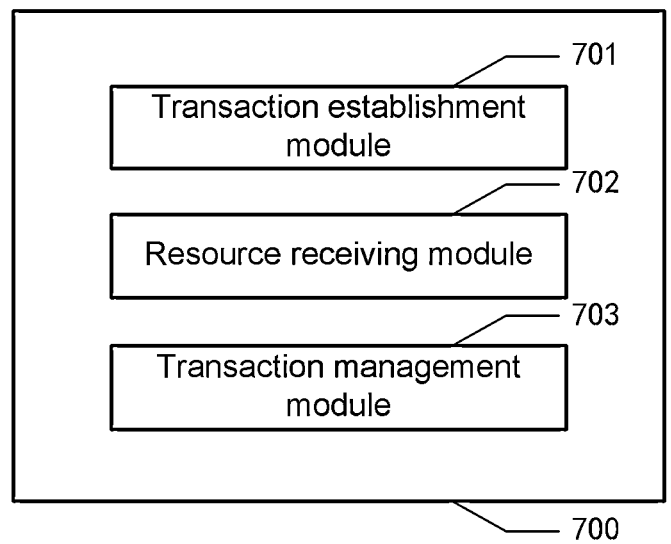
FIG. 7 schematically shows a block diagram of an apparatus for transacting a resource flow according to other embodiments of the present disclosure.

FIG. 7 schematically shows a block diagram of an apparatus for transacting a resource flow according to other embodiments of the present disclosure, where the apparatus 700 for transacting a resource flow is applied to the requester client.

As shown in FIG. 7, the apparatus 700 for transacting a resource flow includes a transaction establishment module 701, a resource receiving module 702, and a transaction management module 703.

The transaction establishment module 701 is configured to select a provider client, and establish an association with the provider client through the blockchain server.

The resource receiving module 702 is configured to receive and use the resource flow provided by the provider client.

The transaction management module 703 is configured to generate the certificate information indicative of the status of the resource flow usage according to a preset rule, and send the certificate information to the blockchain server, so that the blockchain server determines the first value indicative of the value added by the requester client to the provider client based on the certificate information.

In an embodiment of the present disclosure, the transaction establishment module 701 being configured to select a provider client and establish an association with the provider client through the blockchain server includes: the transaction establishment module 701 being configured to acquire resource flow release information of a plurality of provider clients, wherein the resource flow release information includes identification information of the provider client and price information of the resource flow, select a provider client based on the resource flow release information, and send the transaction request information to the blockchain server, wherein the transaction request information is forwarded by the blockchain server to the provider client selected, so that the provider client begins to provide the resource flow in a case where the transaction request information is permitted.

Optionally, the transaction request information may include the digital signature of the requester client, so that the blockchain server forwards the transaction request information to the provider client in a case where the transaction request information is verified to be true based on the digital signature of the requester client.

In an embodiment of the present disclosure, the transaction management module 703 being configured to generate certificate information indicative of the status of the resource flow usage according to a preset rule and send the certificate information to the blockchain server includes: during using of the resource flow, the transaction management module 703 being configured to generate a resource flow usage certificate indicative of the current usage status every preset time interval, and send the resource flow usage certificate to the provider client, so that the resource flow usage certificate is sent to the blockchain server by the provider client.

As an optional embodiment, the resource flow usage certificate includes a digital signature of the requester client, so that the provider client sends the resource flow usage certificate to the blockchain server in response to verifying of the resource flow usage certificate being true based on the digital signature of the requester client.

In the above embodiment, the resource flow may include but is not limited to at least one of a network traffic resource, a power resource, a computing power resource, and/or a designated data flow resource with a real-time dynamic status.

Figure 8:
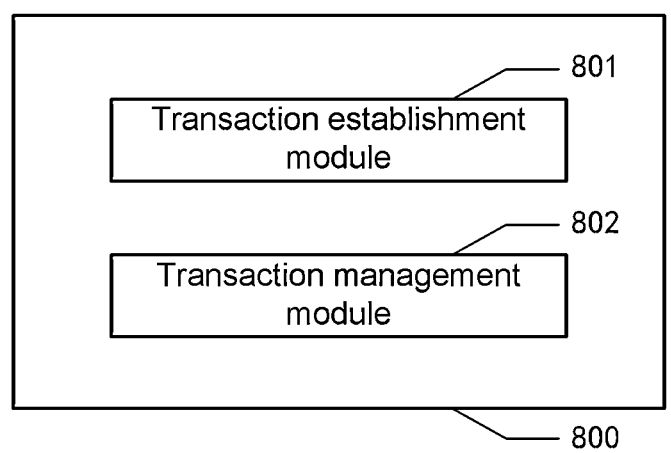
FIG. 8 schematically shows a block diagram of an apparatus for transacting a resource flow according to other embodiments of the present disclosure.

FIG. 8 schematically shows a block diagram of an apparatus for transacting a resource flow according to other embodiments of the present disclosure, where the apparatus 800 for transacting a resource flow is applied to the provider client.

As shown in FIG. 8, the apparatus 800 for transacting a resource flow includes a transaction establishment module 801 and a transaction management module 802.

The transaction establishment module 801 is configured to establish an association with the requester client through the blockchain server, and provide the resource flow to the requester client to enable the requester client to receive and use the resource flow.

The transaction management module 802 is configured to acquire the certificate information indicative of the status of the resource flow usage of the requester client, and send the certificate information to the blockchain server, so that the blockchain server determines the first value indicative of the value added to the provider client by the requester client based on the certificate information.

In an embodiment of the present disclosure, the transaction establishment module 801 being configured to establish an association with the requester client through the blockchain server and provide the resource flow to the requester client includes: the transaction establishment module 801 being configured to: receive the transaction request information sent by the blockchain server, wherein the transaction request information includes the identification information of the requester client and the digital signature of the requester client, and the transaction request information is sent by the requester client to the blockchain server; send the transaction permission information to the blockchain server in a case where the transaction request information is permitted, wherein the transaction permission information includes the transaction request information and the digital signature of the provider client; and begin to provide the resource flow to the requester client.

Further, as an optional embodiment, the transaction request information may further include an estimated total amount of the resource flow to be used. The transaction establishment module 801 is further configured to permit the transaction request information if the estimated total amount of resource flow to be used is not greater than a total amount of the resource flow to be provided.

In an embodiment of the present disclosure, the transaction management module 802 being configured to acquire the certificate information indicative of the status of the resource flow usage of the requester client and send the certificate information to the blockchain server includes: the transaction management module 802 being configured to: receive the resource flow usage certificate sent by the requester client; determine an end of using of the resource flow by the requester client in a case where the resource flow usage certificate is not received after exceeding a predetermined period of time, and send the resource flow usage certificate received to the blockchain server.

Optionally, the resource flow usage certificate sent by the requester client includes the digital signature of the requester client, and the transaction management module 802 is further configured to verify the resource flow usage certificate based on the digital signature of the requester client, and send the resource flow usage certificate to the blockchain server in response to verifying of the resource flow usage certificate being true; and/or the transaction management module 802 is further configured to send the resource flow usage certificate and the digital signature of the provider client to the blockchain server.

In the above embodiment, the resource flow may include but is not limited to at least one of a network traffic resource, a power resource, a computing power resource, and/or a designated data flow resource with a real-time dynamic status.

According to the embodiments of the present disclosure, the apparatus 600 for transacting a resource flow and the apparatus 700 for transacting a resource flow may be deployed in the same client, or may be deployed in different clients, which is not limited here.

It should be noted that implementation modes, to-be-solved technical problems, achieved functions, and achieved technical effects of the modules/units/subunits in the apparatus embodiments are the same as or similar to those of the corresponding steps in the method embodiments, which will not be repeated here.

Any multiple of the modules, sub modules, units and sub units according to the embodiments of the present disclosure, or at least part of the functions of any multiple thereof may be implemented in one module. Any one or more of the modules, sub modules, units and sub units according to the embodiments of the present disclosure may be split into multiple modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module that, when executed, performs the corresponding functions.

For example, any multiple of the initiation module 601, the acquisition module 602 and the management module 603 may be integrated into one module for implementation, or any one thereof may be split into multiple modules. Alternatively, at least part of the functions of one or more of these modules may be combined with at least part of the functions of other modules and implemented in one module. According to the embodiments of the present disclosure, any one of the initiation module 601, the acquisition module 602 and the management module 603 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the initiation module 601, the acquisition module 602 and the management module 603 may be at least partially implemented as a computer program module that, when executed, performs the corresponding functions.

Furthermore, any multiple of the transaction establishment module 701, the resource receiving module 702 and the transaction management module 703 may be integrated into one module for implementation, or any one thereof may be split into multiple modules. Alternatively, at least part of the functions of one or more of these modules may be combined with at least part of the functions of other modules and implemented in one module. According to the embodiments of the present disclosure, at least one of the transaction establishment module 701, the resource receiving module 702 and the transaction management module 703 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the transaction establishment module 701, the resource receiving module 702 and the transaction management module 703 may be at least partially implemented as a computer program module that, when executed, performs the corresponding functions.

Furthermore, the transaction establishment module 801 and the transaction management module 802 may be integrated into one module for implementation, or any one thereof may be split into multiple modules. Alternatively, at least part of the functions of one or more of these modules may be combined with at least part of the functions of other modules and implemented in one module. According to the embodiments of the present disclosure, any one or more of the transaction establishment module 801 and the transaction management module 802 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, any one or more of the transaction establishment module 801 and the transaction management module 802 may be at least partially implemented as a computer program module that, when executed, performs the corresponding functions.

Figure 9:
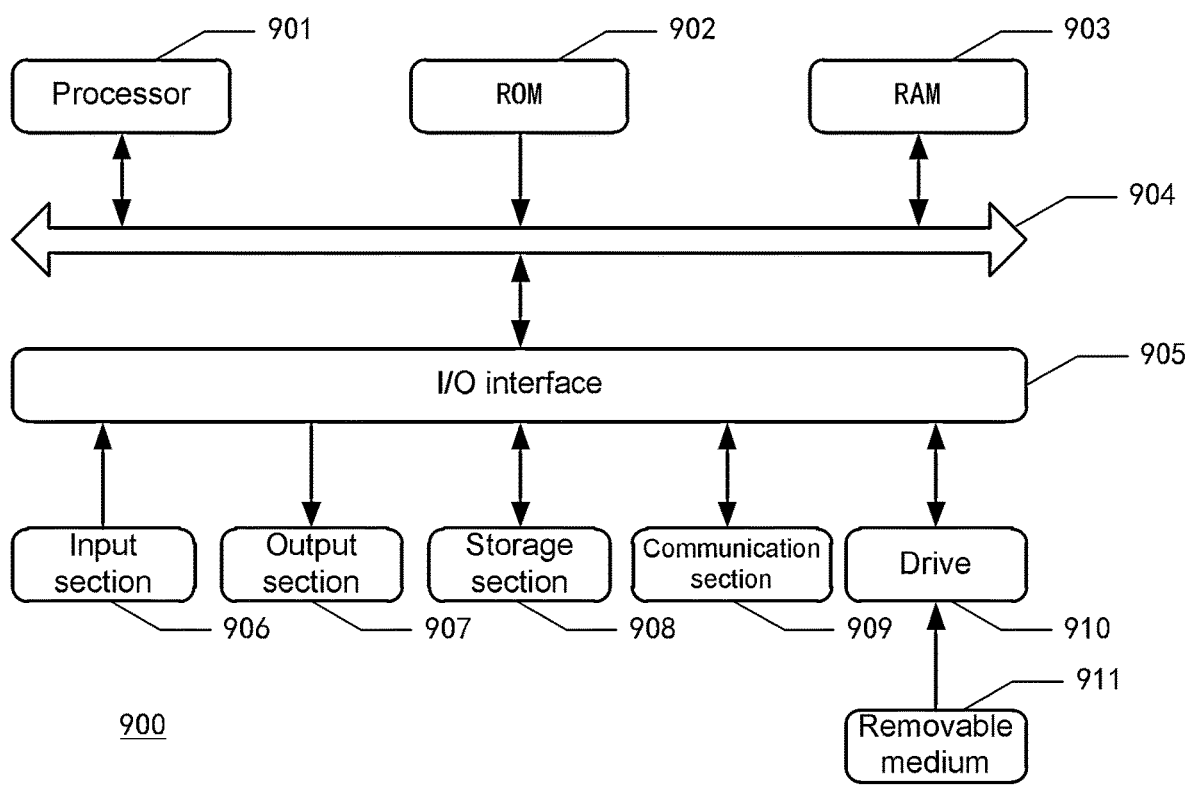
FIG. 9 schematically shows a block diagram of a computer equipment suitable for implementing a method for transacting a resource flow according to embodiments of the present disclosure.

FIG. 9 schematically shows a block diagram of a computer equipment suitable for implementing the above-described methods according to an embodiment of the present disclosure. The computer equipment shown in FIG. 9 is only an example, and should not bring any limitation to the function and scope of use of the embodiments of the present disclosure.

As shown in FIG. 9, a computer equipment 900 according to the embodiment of the present disclosure includes a processor 901, which may execute various appropriate actions and processing according to the program stored in a read only memory (ROM) 902 or the program loaded into a random access memory (RAM) 903 from a storage section 908. The processor 901 may, for example, include a general-purpose microprocessor (for example, CPU), an instruction set processor and/or a related chipset and/or a special-purpose microprocessor (for example, an application specific integrated circuit (ASIC)), and the like. The processor 901 may also include an on-board memory for caching purposes. The processor 901 may include a single processing unit or multiple processing units for executing different actions of the method flow according to the embodiments of the present disclosure.

Various programs and data required for the operation of the computer equipment 900 are stored in the RAM 903. The processor 901, the ROM 902 and the RAM 903 are connected to each other through a bus 904. The processor 901 executes various operations of the method flow according to the embodiments of the present disclosure by executing the programs in the ROM 902 and/or the RAM 903. It should be noted that the program may also be stored in one or more memories other than the ROM 902 and the RAM 903. The processor 901 may also execute various operations of the method flow according to the embodiments of the present disclosure by executing the programs stored in the one or more memories.

According to the embodiment of the present disclosure, the computer equipment 900 may further include an input/output (I/O) interface 905 which is also connected to the bus 904. The computer equipment 900 may further include one or more of the following components connected to the I/O interface 905: an input section 906 including a keyboard, a mouse, etc.; an output section 907 including a cathode ray tube (CRT), a liquid crystal display (LCD), etc. and a speaker, etc.; a storage section 908 including a hard disk, etc.; and a communication section 909 including a network interface card such as a LAN card, a modem, and the like. The communication section 909 performs communication processing via a network such as the Internet. A drive 910 is also connected to the I/O interface 905 as required. A removable medium 911, such as a magnetic disk, an optical disk, a magneto-optical disk, a semiconductor memory, and the like, is installed on the drive 910 as required, so that the computer program read therefrom is installed into the storage section 908 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication section 909, and/or installed from the removable medium 911. When the computer program is executed by the processor 901, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiment of the present disclosure, the computer readable medium may be a computer readable signal medium, a computer readable storage medium, or any combination thereof. The computer-readable storage medium may be, for example, but not limited to, an electric, magnetic, optical, electromagnetic, infrared or semiconductor system, apparatus or device, or any combination thereof. More specific examples of the computer-readable storage medium may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that includes or stores programs that may be used by or in combination with an instruction execution system, apparatus, or device. In the present disclosure, the computer-readable signal medium may include a data signal propagated in a baseband or as a part of a carrier wave, and a computer-readable program code is carried therein. This propagated data signal may take many forms, including but not limited to electromagnetic signals, optical signals, or any suitable combination of the above. The computer-readable signal medium may also be any computer-readable medium other than the computer-readable storage medium. The computer-readable medium may send, propagate, or send the program for use by or in combination with the instruction execution system, apparatus or device. The program code contained on the computer-readable medium may be sent by any suitable medium, including but not limited to: wireless, wired, optical cable, radio frequency signals, etc., or any suitable combination of the above.

For example, according to the embodiment of the present disclosure, the computer-readable storage medium may include the above-mentioned ROM 902 and/or RAM 903 and/or one or more memories other than the ROM 902 and RAM 903.

The flowcharts and block diagrams in the drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method for transacting a resource flow applied to a blockchain server, comprising:
    acquiring initial transaction information for associating a requester client with a provider client, and sending the initial transaction information to other blockchain servers, to cause each blockchain server to store the initial transaction information in respective corresponding blockchain database;
    acquiring certificate information indicative of a status of a resource flow usage of the requester client; and determining a first value indicative of a value added by the requester client to an account of the provider client based on the initial transaction information and the certificate information, and sending the first value to the other blockchain servers, to cause each blockchain server to store the first value in the respective corresponding blockchain database, wherein the acquiring initial transaction information for associating a requester client with a provider client comprises:

receiving transaction request information sent by the requester client, wherein the transaction request information comprises identification information of the requester client, identification information of the provider client, and a digital signature of the requester client;

verifying the transaction request information based on the digital signature of the requester client, and sending the transaction request information to the provider client in response to verifying of the transaction request information being true;

receiving transaction permission information sent by the provider client, wherein the transaction permission information comprises the transaction request information and a digital signature of the provider client; and verifying the transaction permission information based on the digital signature of the provider client, and using the transaction permission information as the initial transaction information for associating the requester client with the provider client, in response to verifying of the transaction permission information being true.

2. The method according to claim 1, wherein, the transaction request information further comprises price information of the resource flow; and determining a first value based on the initial transaction information and the certificate information comprises:

determining a total amount of the resource flow used by the requester client based on the certificate information; and determining the first value based on the price information of the resource flow and the total amount of the resource flow used by the requester client.

3. The method according to claim 1, wherein, the transaction request information further comprises a second value indicative of a value decreased from an account of the requester client; and determining a first value based on the initial transaction information and the certificate information further comprises:

determining a third value indicative of a value added to the account of the requester client if the second value is greater than the first value, wherein the third value is equal to difference between the second value and the first value;

determining a fourth value indicative of a value decreased from the account of the requester client if the second value is less than the first value, wherein the fourth value is equal to difference between the first value and the second value; and sending the third value or the fourth value determined to the other blockchain servers, to cause each blockchain server to store the third value or the fourth value in the respective corresponding blockchain database.

4. The method according to claim 1, wherein, the transaction request information further comprises a second value indicative of a value decreased from an account of the requester client; and determining a first value based on the initial transaction information and the certificate information further comprises: recording difference between the second value and the first value as a fifth value if the second value is greater than the first value, adding the fifth value to the second value corresponding to a next transaction of the resource flow in a case where the next transaction of the resource flow is conducted by the requester client, and obtaining an updated second value corresponding to the next transaction of the resource flow.

5. The method according to claim 1, wherein the acquiring certificate information indicative of a status of a resource flow usage of the requester client comprises:

receiving a resource flow usage certificate sent by the provider client, wherein the resource flow usage certificate comprises a digital signature of the requester client and a digital signature of the provider client, and the resource flow usage certificate is sent from the requester client to the provider client; and verifying the resource flow usage certificate based on the digital signature of the requester client and the digital signature of the provider client, and using the resource flow usage certificate as the certificate information of the resource flow usage of the requester client, in response to verifying of the resource flow usage certificate being true.

6. The method according to claim 1, wherein the resource flow comprises at least one of a network traffic resource, a power resource, a computing power resource, and/or a designated data flow resource with a real-time dynamic status.

7. A method for transacting a resource flow applied to a requester client, comprising:

selecting a provider client, and establishing an association with the provider client through a blockchain server;

receiving and using a resource flow provided by the provider client; and generating certificate information indicative of a status of a resource flow usage according to a preset rule, and sending the certificate information to the blockchain server, to cause the blockchain server to determine a first value indicative of a value added by the requester client to an account of the provider client based on the certificate information;

wherein the selecting a provider client, and establishing an association with the provider client through a blockchain server comprises:

acquiring resource flow release information of a plurality of provider clients, wherein the resource flow release information comprises identification information of provider clients and price information of the resource flow; and selecting a provider client based on the resource flow release information, and sending transaction request information to the blockchain server, wherein the transaction request information is forwarded by the blockchain server to the provider client selected, to cause the provider client to begin to provide the resource flow in a case where the transaction request information is permitted.

8. The method according to claim 7, wherein the transaction request information comprises a digital signature of the requester client, and the blockchain server forwards the transaction request information to the provider client in a case where the transaction request information is verified to be true based on the digital signature of the requester client.

9. The method according to claim 7, wherein the generating certificate information indicative of a status of a resource flow usage according to a preset rule, and sending the certificate information to the blockchain server comprises:

during using of the resource flow, generating a resource flow usage certificate indicative of a current usage status every preset time interval, and sending the resource flow usage certificate to the provider client, to cause the provider client to send the resource flow usage certificate to the blockchain server.

10. The method according to claim 9, wherein the resource flow usage certificate comprises a digital signature of the requester client, and the provider client sends the resource flow usage certificate to the blockchain server in a case where the resource flow usage certificate is verified to be true based on the digital signature of the requester client.

11. A method for transacting a resource flow applied to a provider client, comprising:

establishing an association with a requester client through a blockchain server, and providing a resource flow to the requester client, to cause the requester client to receive and use the resource flow;

acquiring certificate information indicative of a status of a resource flow usage of the requester client, and sending the certificate information to the blockchain server, to cause the blockchain server to determine a first value indicative of a value added to the provider client by the requester client based on the certificate information;

wherein the establishing an association with a requester client through a blockchain server, and providing a resource flow to the requester client comprises:

receiving transaction request information sent by the blockchain server, wherein the transaction request information comprises identification information of the requester client and a digital signature of the requester client, and the transaction request information is sent from the requester client to the blockchain server; and sending transaction permission information to the blockchain server in a case where the transaction request information is permitted, and beginning to provide the resource flow to the requester client, wherein the transaction permission information comprises the transaction request information and a digital signature of the provider client.

12. The method according to claim 11, wherein, the transaction request information further comprises an estimated total amount of the resource flow to be used; and the establishing an association with a requester client through a blockchain server further comprises: permitting the transaction request information in a case where the estimated total amount of the resource flow to be used is not greater than a total amount of the resource flow to be provided.

13. The method according to claim 11, wherein the acquiring certificate information indicative of a status of a resource flow usage of the requester client, and sending the certificate information to the blockchain server comprises:

receiving a resource flow usage certificate sent by the requester client; and determining an end of using of the resource flow by the requester client in a case where the resource flow usage certificate is not received after exceeding a predetermined period of time, and sending the resource flow usage certificate received to the blockchain server.

14. The method according to claim 13, wherein, the resource flow usage certificate sent by the requester client comprises a digital signature of the requester client, and the sending the resource flow usage certificate received to the blockchain server further comprises: verifying the resource flow usage certificate based on the digital signature of the requester client, and sending the resource flow usage certificate to the blockchain server in response to verifying of the resource flow usage certificate being true; and/or the sending the resource flow usage certificate received to the blockchain server further comprises: sending the resource flow usage certificate and the digital signature of the provider client to the blockchain server.

15. A computer equipment, comprising a memory, a processor, and a computer program stored in the memory and executable on the processor, wherein the computer program, when executed by the processor, cause the processor to perform the method for transacting a resource flow according to claim 1.

16. A non-transitory computer-readable medium having executable instructions stored thereon, wherein the executable instructions, when executed by a processor, cause the processor to perform the method for transacting a resource flow according to claim 1.

17. A computer equipment, comprising a memory, a processor, and a computer program stored in the memory and executable on the processor, wherein the computer program, when executed by the processor, cause the processor to perform the method for transacting a resource flow according to claim 7.

* * * * *

UNITED STATES PATENT AND TRADEMARK OFFICE
CERTIFICATE OF CORRECTION

| | |
|---|---|
| PATENT NO. | : 12,026,760 B2 |
| APPLICATION NO. | : 17/283824 |
| DATED | : July 2, 2024 |
| INVENTOR(S) | : Yi Shi and Yan Zhang |

It is certified that error appears in the above-identified patent and that said Letters Patent is hereby corrected as shown below:

On the Title Page

Column 1 (item (72) Inventors), Line 1, delete "Yang" and insert -- Yan --.

Signed and Sealed this
Tenth Day of September, 2024

Katherine Kelly Vidal
*Director of the United States Patent and Trademark Office*